(12) United States Patent
Fields et al.

(10) Patent No.: US 6,287,672 B1
(45) Date of Patent: *Sep. 11, 2001

(54) BRIGHT METALLIZED FILM LAMINATE

(75) Inventors: Thomas R. Fields, Charlotte; Don Smith; Quan Song, both of Matthews; Mark O. Outlaw, Charlotte, all of NC (US); Kenneth W. Dick, Fremont, CA (US)

(73) Assignee: Rexam, Inc., Matthews, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/268,085

(22) Filed: Mar. 12, 1999

(51) Int. Cl.⁷ .............................. B32B 15/00; B32B 3/00; B32B 7/00
(52) U.S. Cl. ..................... 428/209; 428/409; 428/421; 428/423.1; 428/500
(58) Field of Search ..................... 428/209, 409, 428/421, 423.1, 500

(56) References Cited

U.S. PATENT DOCUMENTS

| | | |
|---|---|---|
| 4,115,619 | 9/1978 | Kurfman et al. . |
| 4,211,822 | 7/1980 | Kurfman et al. . |
| 4,351,864 | 9/1982 | Giannakidis . |
| 4,403,004 | 9/1983 | Parker et al. . |
| 4,407,871 | 10/1983 | Eisfeller . |
| 4,431,711 | 2/1984 | Eisfeller . |
| 4,816,324 | 3/1989 | Berman . |
| 4,837,068 | 6/1989 | Martin et al. . |
| 4,904,526 | 2/1990 | Koskenmaki . |
| 4,928,908 | 5/1990 | Horii . |
| 4,952,293 * | 8/1990 | Sypula et al. ..................... 204/180.7 |
| 5,024,881 | 6/1991 | Matucha et al. . |
| 5,028,492 | 7/1991 | Guenin . |
| 5,141,702 | 8/1992 | Guenin et al. . |
| 5,284,679 | 2/1994 | Eisfeller . |
| 5,320,869 | 6/1994 | Eisfeller et al. . |
| 5,384,161 | 1/1995 | Eisfeller et al. . |
| 5,418,056 | 5/1995 | Noguchi et al. . |
| 5,536,539 | 7/1996 | Ellison et al. . |
| 5,738,934 | 4/1998 | Jones . |
| 5,759,727 | 6/1998 | Halhotra . |
| 5,976,671 | 11/1999 | Gleim . |
| 5,985,418 | 11/1999 | Lein et al. . |
| 6,060,135 | 5/2000 | Service . |
| 6,071,621 | 6/2000 | Falaas et al. . |
| 6,083,628 | 7/2000 | Yializis . |
| 6,093,278 | 7/2000 | Wade . |
| 6,113,838 | 9/2000 | Flynn et al. . |

FOREIGN PATENT DOCUMENTS

| | | |
|---|---|---|
| 62 156942 | 7/1987 | (JP) . |
| 03 225 322 | 10/1991 | (JP) . |
| 03 296769 | 12/1991 | (JP) . |

* cited by examiner

Primary Examiner—Bruce H. Hess
Assistant Examiner—B. Shewareged
(74) Attorney, Agent, or Firm—Summa & Allan, P.A.

(57) ABSTRACT

A bright metallized laminate is disclosed that includes a polyvinylidene difluoride-acrylic film having microscopically smooth surfaces, a discontinuous layer of indium islands deposited on the polyvinylidene difluoride-acrylic film, an adhesive layer bonded to the surface of the discontinuous indium layer opposite the polyvinylidene difluoride-acrylic film, and a thermoplastic backing layer bonded to the adhesive layer opposite the discontinuous layer of indium islands. An associated method is disclosed for forming the bright metallized laminate that includes the steps of casting a polyvinylidene difluoride-acrylic film to a polymeric substrate, depositing a discontinuous layer of indium islands upon the polyvinylidene difluoride-acrylic film, placing a polymeric film onto the discontinuous layer of indium islands, and press polishing the polyvinylidene difluoride-acrylic film and the discontinuous indium layer. The polyvinylidene difluoride-acrylic film demonstrates a roughness average (RA) of about 0.75 micron or less, and a distinctness of image (DOI) of about 95 or more.

83 Claims, 5 Drawing Sheets

BRIGHT METALLIZED FILM LAMINATE

FIELD OF THE INVENTION

The invention relates to bright film technology. In particular, the invention is a bright metallized film laminate that has superior optical and deformation properties. In a preferred embodiment, the film laminate includes a layer of discontinuous indium islands deposited on a polyvinylidene difluoride-acrylic alloy film. The invention is also an improved method of making bright metallized film laminates.

BACKGROUND OF THE INVENTION

Metallized polymeric finishes can be used to complement and even replace bright, reflective metal surface treatments, particularly chrome plating. Polymeric structures having metallized finishes are commonly used as substitutes for articles, such as automobile grills, that are expected to have a chrome-plated appearance. Decorative polymeric components, in fact, are becoming standard in the automobile industry, primarily because plastics are relatively flexible, corrosion-resistant, and inexpensive. Plastic parts also reduce vehicle weight, which enhances performance, especially fuel economy.

Many patents disclose metallized substrates. For example, U.S. Pat. No. 5,035,940 describes a polymer-backed aluminum substrate with a weather-resistant polymer coating. Similarly, U.S. Pat. No. 5,536,539 describes an automotive component formed from a molded polymer article having a decorative polymeric film surface. Both of these patents are commonly-assigned with the present invention.

Conventional in-situ methods of metallizing polymeric substrates often directly coat metal onto molded substrates, usually by vacuum deposition. In this regard, indium has gained acceptance as a preferred metal because on a microscopic scale it tends to form small, discrete deposits or "islands." When bent or flexed, discontinuous metal layers tend to retain the desired optical properties better than do continuous metal films, which tend to fracture. Discrete metallization also minimizes electrical conductivity, which can hasten unwanted corrosion. For example, U.S. Pat. No. 4,431,711 (Eisfeller) addresses indium metallizing three-dimensional articles in a way that minimizes electrical conductivity and, consequently, corrosion.

In most cases, the metallized layer is covered with a transparent polymeric coating that physically and chemically protects its surface—a so-called "clear coat." Although in-situ metallization of formed polymeric articles is useful, it requires separate applications of a base coat, a metallized layer, and a clear coat. This necessitates drying time for each application, which lengthens the processing times associated with metallizing three-dimensional articles. Therefore, depositing metal directly onto an article only after the article has been formed can be disadvantageous.

Alternatively, metallized film laminates (i.e., adhesive tapes) that can be applied to polymeric structures offer certain advantages over conventional in-situ metallization techniques. For example, metallized film laminates can be manufactured, stored, and shipped in roll form. Such laminates also facilitate customized application, limited only by adhesive effectiveness. Moreover, using a metallized film laminate reduces chemical compatibility problems that can arise between the metal and the polymeric substrate when metallizing articles in-situ.

To manufacture a metallized film laminate, a polymeric substrate is typically coated with a desired metal, often via vacuum deposition. Then, a polymeric clear coat is added to the metallization layer using conventional techniques, such as casting or doctor-blade applications. Using such metallized film laminates, though convenient, can result in an inferior finish as compared to that obtained by in-situ techniques. Therefore, it is desirable to achieve a finish similar to an in-situ process, yet with the convenience of a film laminate.

To that end, there are known to be metallized laminates that can be formed into desired shapes using conventional techniques. In addition, such molded laminates can be filled with thermoplastic polymer to produce a solid article having a similar bright finish as an article that has been metallized by in-situ methods.

For example, U.S. Pat. No. 4,101,698 (Dunning et al.) discloses a metallized elastomeric laminate that can provide a reflective metal surface finish for three-dimensional contoured shapes. In particular, the metallized layer is applied to an elastomeric film in separate, discontinuous planar segments. U.S. Pat. No. 4,115,619 (Kurfman et al.) discloses a bright multi-layer polymer composite formed by metallizing a thermoplastic polymer layer with a soft metal, such as indium. The metal layer is applied by conventional techniques, such as vacuum deposition, sputtering, or lamination. The metallized film can then be molded into a desired shape using conventional forming processes. U.S. Pat. No. 4,403,004 (Parker et al.) describes a metallized laminate formed of a thermoformable base layer that is coated on both sides with vapor deposited metal. This laminate is capable of being thermoformed to assume three-dimensional shapes.

Such formable film laminates have poor flexibility, however, often cracking when the metallized substrates are excessively deformed. Moreover, such moldable films tend to lose luster over time. This is particularly pernicious with respect to metallized indium layers, which in the presence of halogen-containing polymers (e.g., polyvinyl chloride, "PVC") can undergo an oxidation-reduction reaction that converts elemental indium to indium trichloride. Finally, to the extent such moldable films are formed from continuous metallized layers, corrosion problems result.

Accordingly, a need exists for a bright metallized, formable film laminate that addresses these problems.

OBJECT AND SUMMARY OF THE INVENTION

Therefore, it is an object of the present invention to provide a bright metallized film laminate having superior optical and deformation properties, and a method of making such film laminates.

In its broadest form, the invention comprises a metallized formable laminate made of a discontinuous layer of indium islands deposited on a microscopically smooth film formed of an alloy containing polyvinylidene difluoride (PVDF) and an acrylate polymer. In the preferred embodiments the film is the FLUOREX®-brand fluoropolymer (Rexam, Inc., Matthews, N.C.) in which the polyvinylidene difluoride film includes about 25 percent acrylic component. This indium-FLUOREX® combination has superior, quantifiable optical and deformation properties as compared to other bright, formable films.

In another aspect, the invention includes an adhesive layer placed on the surface of the discontinuous indium layer opposite the PVDF-acrylate (or "acrylic") film. A thermoplastic layer is then placed on the adhesive. Such a thermoplastic layer may be comprised of polyvinyl chloride (PVC), thermoplastic olefin (TPO), polycarbonates (PC), or acrylonitrile-butadiene-styrene (ABS) copolymer. The adhesive layer prevents the undesirable formation of indium oxide ($In_2O_3$), a whitish, unreflective compound. Moreover, when the thermoplastic layer includes polyvinyl chloride, the adhesive layer helps to prevent chloride ion or hydrochloric acid from reacting with the indium layer to form indium trichloride ($InCl_3$), an unreflective compound.

In yet another aspect, a thermoplastic leveling layer may be included between the discontinuous indium layer and the polyvinylidene difluoride film. In preferred embodiments, this leveling layer includes polyurethane. During heating operations, such as forming processes, the leveling layer keeps the smooth polyvinylidene difluoride layer from microscopically wrinkling. This maintains the metallized laminate's superior distinctness of image (DOI). As used herein, microscopically wrinkling means folds in the PVDF-acrylic film having amplitude of less than about 0.5 micron, or about two percent of the film thickness.

In still another aspect, the invention includes an extensible polyurethane mask that is placed on the surface of the PVDF-acrylic film opposite the discontinuous indium layer. This polyurethane mask helps maintain gloss when the indium-metallized, PVDF-acrylic film is stretched.

The invention also includes methods for forming the indium-metallized, polyvinylidene difluoride thermoplastic laminate. One preferred method includes casting a PVDF-acrylic film onto a polyethylene terephthalate substrate and then depositing a discontinuous layer of indium islands onto the polyvinylidene difluoride film. A polyester (e.g., polyethylene terephthalate) film is placed onto the discontinuous layer of indium islands, then the PVDF-acrylic film and the discontinuous indium layer are "press polished." Alternatively, the polyvinylidene difluoride film may be press polished before the addition of the discontinuous indium layer.

Thereafter, the polyethylene terephthalate film is removed from the discontinuous indium layer. A laminate comprising an adhesive layer and a thermoplastic layer is subsequently bonded to the surface of the discontinuous indium layer such that the adhesive layer contacts the discontinuous indium layer. At this point, the polyethylene terephthalate substrate is removed from the polyvinylidene difluoride film. This process yields the desired polyvinylidene difluoride film metallized with indium.

In another aspect, an extensible masking layer is added to the PVDF-acrylic film opposite the discontinuous indium layer after the polyester substrate is removed. The masking layer maintains laminate gloss during forming processes.

In yet another aspect, a thermoplastic leveling layer is first placed on the polyvinylidene difluoride film such that the discontinuous indium layer is directly formed on the leveling layer rather than on the polyvinylidene difluoride film. Use of a leveling layer can eliminate the need for press polishing the polyvinylidene difluoride.

The foregoing, as well as other objectives and advantages of the invention and the manner in which the same are accomplished, is further specified within the following detailed description and its accompanying drawings.

DETAILED DESCRIPTION OF THE INVENTION

In a broad aspect, the invention is a bright metallized laminate made from a PVDF-acrylic film, and a discontinuous layer of indium islands that has been deposited on the PVDF-acrylic film. As herein disclosed, the thickness of the PVDF-acrylic film is typically about 1–2 mil, or about 25–50 microns, and the discontinuous indium layer is typically about 100–800 angstroms, or less than 0.1 micron. The inventors have discovered that the use of a microscopically smooth PVDF-acrylic film in combination with discontinuous indium islands leads to a synergistic result. In particular, PVDF-acrylic is a superior polymer in obtaining a bright metallized laminate that has improved optical and deformation properties. The PVDF-acrylic forms an exceptionally weatherable clear coat.

As described herein, reference to PVDF-acrylic will be understood by those of skill in the art to include polymer blends or alloys in which polyvinylidene difluoride is the major polymer component. In particular, the present invention can be successfully practiced using a polyvinylidene difluoride polymer that includes about 30 percent and sometimes up to 70 percent, by weight of an acrylic polymer, typically polymethyl methacrylate (PMMA) or polyethyl methacrylate (PEMA), with others useful as well. In general, higher acrylic percentages offer greater scratch resistance, but at the cost of less chemical resistance (especially to solvents) and some increased brittleness.

It will be understood by those skilled in the art that PVDF-acrylic films may be available in different colors. Accordingly, the metallized films described herein may be made in various colors by incorporating appropriately tinted PVDF-acrylic films. PVDF-acrylic films may be tinted, for example, using pigments, inks, or mica, and such can be added as desired without undue experimentation.

As used herein, the phrase "microscopically smooth" means that the surface has a Roughness Average (RA) of 0.75 micron or less. As known to those familiar with microscopic surfaces, the RA is the arithmetic average of the absolute values of the deviations of the roughness profile from the mean profile; i.e., "the arithmetic average of all departures of the roughness profile from the mean line." (U.S. Pat. No. 4,875,262 at column 4, lines 26–31).

In one embodiment, the bright metallized laminate of the present invention includes a discontinuous layer of indium islands deposited upon a microscopically smooth PVDF-acrylic film. As will be known to those of skill in the art, a conventional method for accomplishing this is vapor deposition of indium. An adhesive layer is bonded to the surface of the discontinuous indium layer such that the discontinuous indium layer is sandwiched between the PVDF-acrylic film and the adhesive layer. A thermoplastic layer that eventually serves as a backing for the final film structure, is bonded to the adhesive layer opposite the discontinuous indium layer, and completes the metallized laminate structure. Optionally, as described herein, an extensible polyurethane mask layer may be added to the PVDF-containing film opposite the discontinuous indium layer.

In preferred embodiments, the adhesive layer is formed from a polyurethane layer and an acrylic layer. In such embodiments, the polyurethane layer is in direct contact with the discontinuous indium layer and the acrylic layer is in direct contact with the thermoplastic substrate layer. In other words, the polyurethane layer of the adhesive layer is sandwiched between the discontinuous indium layer and the acrylic layer of the adhesive layer. Likewise, the acrylic layer of the adhesive layer is sandwiched between the thermoplastic substrate layer and the polyurethane layer of the adhesive layer. The acrylic adhesive layer improves laminate processing, but is otherwise unnecessary to the resulting bright metallized laminate. A most suitable polyurethane adhesive is Novacote® ADH 222, manufactured by Stahl. Likewise, a most suitable heat-reactive thermoplastic acrylic adhesive is Elvacite® 2009, manufactured by ICI. With respect to the thermoplastic backing layer, the inventors have found that while conventional thermoplastics perform satisfactorily, certain kinds of thermoplastics are preferred. In particular, the invention is best practiced by employing a thermoplastic substrate layer made from polyvinyl chloride, thermoplastic olefins, acrylonitrile-butadiene-styrene copolymers (ABS), polycarbonates, polystyrene, and blends of these polymers.

In addition, the metallized films described herein may be made in various colors by incorporating an appropriately tinted adhesive layer or thermoplastic backing layer. For example, the adhesive layer (i.e., the polyurethane adhesive layer, the acrylic adhesive layer, or both) or the thermoplastic backing layer may be tinted using pigments, inks, or mica.

The metallized laminate of this first embodiment may be formed into articles of manufacture, such as auto parts. In particular, this metallized laminate may be die cut using methods that are well known to those of skill in the art.

In another embodiment, the bright metallized laminate of the present invention and the discontinuous layer of indium islands are separated from one another by a thermoplastic leveling layer. As herein described, this leveling layer, which is typically between about 0.5 and 1.0 mil (or about 10 to 25 microns) helps to prevent the indium from wrinkling during hot processing steps. The leveling layer also helps retain superior distinctness of image (DOI), upwards of 95 DOI, as compared to the more conventional 65 DOI. As used herein, distinctness of image is a measure of the optical quality of a reflective surface. DOI is measured using a DOI meter such as the I$^2$R Glow Box Model GB11-86M from Instruments for Research and Industry, Cheltenham, Pa. The inventors have discovered that a leveling layer made from polyurethane (alone) or acrylic (alone) seems to work well, with a combination of acrylic on FLUOREX® and polyurethane on acrylic being most preferred. More specifically, the polyurethane SU6729, manufactured by Stahl, is most preferred.

In a preferred embodiment, a thermoplastic primer layer separates the PVDF-acrylic film and the leveling layer. This primer layer functions to bond the leveling layer to the PVDF-acrylic film. As will be understood by those of skill in the art, PVDF-acrylic bonds only with difficulty to other polymeric materials. The inventors have discovered that acrylic compounds containing about 2% epoxy are satisfactory for primers, as are chlorinated polyolefins. A preferred primer is the acrylic 68070, which is manufactured by DuPont.

In conformance with the structure disclosed earlier, a laminate that includes a PVDF-acrylic film, a leveling layer, and a discontinuous indium layer can be further enhanced by the placement of an adhesive layer onto the discontinuous indium layer, opposite the leveling layer. In other words, the discontinuous indium layer is sandwiched between the leveling layer and an adhesive layer. As noted earlier, preferred adhesive layers are comprised of a polyurethane layer and an acrylic layer. The adhesive layers are placed such that the polyurethane layer of the adhesive layer contacts the discontinuous indium layer.

Furthermore, and in conformance with the first structural embodiment disclosed previously, the thermoplastic substrate layer completes the structure. This thermoplastic backing layer is positioned on the adhesive layer, specifically in contact with the acrylic layer of the adhesive layer. As noted, the inventors have found polyvinyl chloride, thermoplastic olefins, polycarbonates, and acrylonitrile-butadiene-styrene copolymers to be exceptional thermoplastic backing layers.

This second structural embodiment, like the first, can be formed into metallized articles of manufacture, especially auto parts. Additionally, the presence of a thermoplastic leveling layer ensures that parts formed from the metallized laminate can be successfully injection molded. As will be understood by those of skill in the art, injection molding includes filling the cavity defined by the interior of the formed part with filler material, usually polymeric filler. Furthermore, the metallized film described herein may be made in a particular color by incorporating an appropriately tinted leveling layer.

The term "forming" is herein used in a broad sense and can include a variety of relatively specific techniques that include, but are not limited to, thermoforming, blow molding, compression molding, and "in-mold" forming (e.g. concurrent filling and forming), as well as any other modified or related techniques that take advantage of the thermoplastic nature of the polymer portions of films according to the present invention.

Additionally, an extensible mask layer may be added to the PVDF-acrylic film before forming the metallized laminate. The extensible mask layer is designed to maintain gloss and DOI during thermoforming processes, vacuum forming processes, and molding processes, including injection molding, blow molding, and compression molding. The mask layer also adds strength to the metallized laminate. Additionally, the extensible mask layer protects the underlying layers of the metallized laminate from scratching or marring until the formed part is ready for display. The mask layer is capable of stretching up to about 600 percent during forming and has a room temperature elongation at break of at least about 200 percent. Room temperature is herein defined as about 15° C. to about 30° C.

Preferably, the extensible polyurethane mask layer is pre-formed on a polymeric substrate, such as polyester. The polyurethane mask layer is placed directly upon the polyvinylidene difluoride-containing film and the polymeric substrate is removed from the mask layer. To facilitate this procedure, the polyester substrate to which the PVDF-acrylic film is weakly bonded must first be removed.

The mask layer may be retained as a protective outer layer while manufacturing articles from the metallized laminate. The extensible mask layer is releasably bonded to the underlying PVDF-acrylic layer of the metallized laminate and may be stripped away in a single piece to reveal the underlying PVDF-acrylic layer of the metallized laminate. In a preferred embodiment, the mask layer is substantially transparent to permit visual inspection for surface defects without having to remove the mask layer.

Additionally, the extensible mask layer maintains high gloss and DOI during injection or compression molding, such as thermoplastic or thermoset compression molding, which employ a roughened or deglossed mold. Roughened molds are functionally superior to highly polished molds, despite being less expensive, because the rough mold surface facilitates air removal from the mold as the mold closes. The extensible mask layer protects the metallized laminate from gloss reduction, or other damage caused by the mold, without using highly polished molds.

Preferably, the extensible mask layer is about 0.3 mils to about 3.0 mils thick. The extensible mask layer comprises a polyurethane polymer. Preferably, the mask layer comprises a dried film of an aliphatic or aromatic polyester or polyether polyurethane in the form of a dispersion or a solution. For example, polyurethane polymers QA 5218 and QA 5026, manufactured by Mace Adhesives and Coatings of Dudley, Mass., may be used to form the mask layer. In one embodiment, the mask layer comprises between about 85 and 99.5 weight percent of a water-based, polyurethane dispersion. Advantageously, a small amount of surfactant (between about 0.05 and 0.2 weight percent) is added to lower surface tension. A preferred surfactant is SURFYNOL 104H, which is manufactured by Air Products of Allentown, Pa.

The mask layer composition may include additives that migrate into the PVDF-acrylic layer to enhance weatherability or other desirable properties. (Mask layer additives can also prevent migration of additives from the PVDF-acrylic layer into the polyurethane mask layer.) Migratory additives suitable for use with the present invention include, but are not limited to, hardness enhancers, release agents, ultraviolet light stabilizers, antioxidants, dyes, lubricants, surfactants, catalysts, and slip additives.

More specifically, the migratory additives useful in the present invention include benzophenone, silicones, waxes, triazoles, triazines, and combinations of these additives. The migratory additives are forced to migrate into the outer surface of the PVDF film by the heat or pressure present during forming or molding processes. Additionally, the presence of these additives in the mask layer prevents migration of additive components from the PVDF- acrylic layer into the mask layer.

Ultraviolet light stabilizers, such as TINUVIN 1130 and TINUVIN 292, both manufactured by Ciba Geigy of Hawthorne, N.Y., can be added to the mask layer composition as migratory additives. Silicone additives, such as BYK333, which is manufactured by BYK Chemie of Wallingford, Conn., can be added to lower the coefficient of friction of the PVDF-acrylic layer. The migratory additives are generally added in amounts ranging from between about 0.01 and 2.0 weight percent, with all additives typically accounting for no more than about 5.0 weight percent of the mask layer composition.

Even without the extensible mask layer, the metallized laminates herein described are capable of retaining their desirable optical properties even upon undergoing tremendous deformation, including being stretched and die cut in amounts of up to 200 area percent while retaining the DOI of 95 or better noted above. This promotes the use of the metallized laminate in additional kinds of forming operations. In particular, the inventors have discovered that the metallized laminate may be placed over a relatively cooler article such that when the air between the metallized laminate and the article is removed, the metallized laminate will adhere to the contours of the article. More specifically, the inventors have discovered that the metallized laminate should be at a temperature of between 280 degrees Fahrenheit and 370 degrees Fahrenheit, and the article should be at a temperature of less than about 120 degrees Fahrenheit. As will be known to those of skill in the art, removal of entrained air may be accomplished by placing the metallized laminate onto the article under reduced pressure conditions (i.e., less than atmospheric pressure). The inventors have discovered that this process reduces iridescence of the formed, metallized film laminate. As will be known by those skilled in the art, iridescence is a rainbow-like display of color that is caused by differential light refraction.

In another broad aspect, the invention relates to improved methods for forming bright metallized laminates. More specifically, the present invention includes novel processing steps not previously disclosed in the prior art. One such advancement is the step of press polishing a PVDF-containing film to make it microscopically smooth. The inventors have discovered that unmodified PVDF-acrylic films are microscopically rough. This reduces the optical clarity of the resulting metallized film. In other words, exceptional smoothness has a favorable impact on the optical properties of molded and unmolded metallized laminates. Press polishing, as hereinafter disclosed, is the process of smoothing the surface of PVDF-containing film.

In one embodiment, press polishing is directed to the PVDF-acrylic film, preferably FLUOREX®, before it is metallized. The PVDF-acrylic film is continuously coated onto a polymeric substrate, preferably a polyester substrate, then dried through an oven. As the PVDF-acrylic film exits the oven, a polymeric film, preferably a polyester film, is applied to the PVDF-acrylic film opposite the polymeric substrate. Then, this structure is continuously pressed between a nip that is formed by two rollers, one or both of which are heated. The polymeric film is thereafter removed to facilitate the indium metallizing of the PVDF-acrylic film.

In another embodiment, press polishing is directed to a structure that includes a discontinuous layer of indium islands deposited on a PVDF-containing film. First, the discontinuous indium layer and the PVDF-acrylic layer are weakly bonded to polymeric materials. More specifically, the PVDF-acrylic film is applied to a polymeric substrate, preferably a polyester substrate, opposite the discontinuous indium layer, and a polymeric film, preferably a polyester film, is applied to the discontinuous indium layer opposite the PVDF-acrylic film. Then, this polymeric structure, which includes both a discontinuous indium layer and PVDF-acrylic film, is fed through a heated nip. Thereafter, the polymeric film is removed from the discontinuous indium layer.

The inventors have discovered that polyester (e.g., polyethylene terephthalate, "PET") seems to work best as the polymeric substrate to which the PVDF-acrylic film is weakly bonded. Likewise, the inventors have discovered that polyester seems to work best as the polymeric film that is placed upon the discontinuous layer of indium islands. Mylar® D polyester film from DuPont has a smooth surface quite suitable for the process.

Furthermore, the method of forming a bright metallized film laminate can also include bonding an adhesive layer onto the surface of the discontinuous indium layer. In this step, the indium layer is sandwiched between the adhesive layer and the PVDF-acrylic film. Thereafter, the method can include the step of heat laminating a thermoplastic backing layer to the adhesive layer using conventional processes known by those of skill in the art.

With respect to the placement of the adhesive layer onto the discontinuous indium layer, the inventors have discovered that this is facilitated by first forming a composite adhesive layer. This step of forming an adhesive composite, which is made of an adhesive layer and an underlying polymeric substrate, is yet another aspect of the invention. The adhesive composite is preferably formed by depositing an acrylic adhesive onto a separate polymeric substrate, preferably polyester, then depositing a polyurethane adhesive layer onto the acrylic adhesive layer. The acrylic adhesive layer is thus sandwiched between the polymeric substrate and the polyurethane adhesive layer. This creates an adhesive composite. As described previously, the acrylic layer improves adhesion. The polymeric substrate, which acts as a carrier, is stable when exposed to heat while the adhesives are cured.

The pre-formed adhesive composite may then be bonded to the discontinuous indium layer such that the polyurethane layer of the adhesive composite is in contact with a discontinuous indium layer. Thereafter, the polymeric carrier substrate can be removed from the acrylic adhesive layer. This leaves the adhesive layer, which is made up of a polyurethane adhesive layer and an acrylic adhesive layer.

Furthermore, once the adhesive layer is bonded to the discontinuous indium layer, a thermoplastic substrate layer (thermoplastic backing layer) can be bonded to the adhesive layer. The inventors have found that substrate layers made from polyvinyl chloride, thermoplastic olefins, polycarbonates, or acrylonitrile-butadiene-styrene copolymers are especially effective thermoplastic backing layers.

The inventors have learned that first forming a composite adhesive layer is advisable because the preferred thermoplastic substrate layers do not withstand the heated drying of the acrylic adhesive layer and the polyurethane adhesive layer. Thus, the adhesive composite is formed on a polymeric carrier substrate, usually polyester, before being bonded to the discontinuous indium layer. Preferred polymeric substrates are stable when exposed to heat. Thereafter, the polymeric carrier substrate, which is adjacent to acrylic adhesive layer, is replaced by a thermoplastic substrate layer.

Example 1: The film can be formed using the following steps: depositing a layer of indium at an optical density (OD) of 1.15 on FLUOREX® A film (Rexam) through vacuum deposition; press polishing by bonding a 1 mil PET (ICI 445) onto the indium surface through a hot nip (330–380° F.); making an adhesive composite by casting an acrylic material (Elvacite® 2009) at a dry thickness of 0.5 mil on a 2 mil PET and casting a polyurethane (ADH 222 from Novacote®) at a dry thickness of 0.5 mil on dried Elvacite® 2009; removing the PET from the indium surface and bonding the ADH 222 surface of the adhesive composite to the indium surface; removing the PET from the adhesive composite, and then bonding the composite to a 20 mil ABS through a hot nip at between 330° to 380° F.

In another embodiment, the inventive method includes forming a bright metallized laminate by first coating a PVDF-acrylic film onto a polymeric substrate, preferably polyester. Then, a discontinuous indium layer is deposited on the PVDF-acrylic film using conventional methods. Finally, an adhesive layer is placed onto the surface of the discontinuous indium layer, such that the indium layer is sandwiched between the PVDF-acrylic film and the adhesive layer.

The inventors have discovered that the discontinuous indium layer poorly receives adhesives that are dissolved in solvents that are also solvents for the PVDF-acrylic composition. Accordingly, the adhesive is most preferably a nonsolvent with respect to the PVDF-acrylic composition, because adhesives that are potential solvents tend to result in a hazy appearance. Thus, the preferred technique is to laminate a pre-set adhesive layer to the indium islands. Accordingly, in preferred embodiments, the placement of the adhesive layer onto the surface of the indium layer comprises first forming an adhesive composite, as previously disclosed. In preferred structures, the adhesive composite includes an acrylic adhesive layer and a polyurethane adhesive layer. Alternatively, it appears that certain alcohol-based or water-based liquid adhesives may be formed in situ upon the discontinuous indium layer and will prevent hazing of the end product.

In another aspect, the method further includes the step of heat bonding a thermoplastic substrate layer to the adhesive layer, preferably to the acrylic adhesive layer. As noted, the thermoplastic substrate layer is preferably comprised of polyvinyl chloride, thermoplastic olefins, polycarbonates, or acrylonitrile-butadiene-styrene copolymers.

In yet another aspect, the discontinuous layer of indium islands and the PVDF-acrylic film upon which it is deposited are together press polished before the placement of the adhesive layer onto the discontinuous indium layer. Alternatively, the PVDF-acrylic film may be press polished before the addition of the discontinuous indium layer. Press polishing is discussed earlier, and the technique can be the same as those disclosed above.

In yet another embodiment, the inventive method includes first casting a PVDF-acrylic film onto a polymeric substrate, preferably polyester. Next, a polyurethane leveling layer is deposited onto the PVDF-acrylic film. Thereafter, the discontinuous layer of indium islands is deposited onto the polyurethane leveling layer.

Alternatively, an acrylic primer layer may be placed onto the PVDF-acrylic film before deposition of the polyurethane leveling layer. As described earlier, the primer layer promotes bonding between the PVDF-acrylic film and a polyurethane leveling layer.

In another aspect, a polymeric substrate, preferably polyester, is placed on the discontinuous indium layer and the structure is then press polished, in conformance with the procedure previously described. The PVDF-acrylic film and the discontinuous indium layer may be press polished despite being separated by either (1) a polyurethane leveling layer or (2) an acrylic primer layer and a polyurethane leveling layer. Alternatively, the PVDF-acrylic film may be press polished before the addition of the discontinuous indium layer.

In yet another aspect, an adhesive layer is placed onto the surface of the discontinuous indium layer, such that the indium layer is sandwiched between the polyurethane leveling layer and the adhesive layer. Most preferably, the placement of the adhesive layer onto the surface of the indium layer comprises first forming an adhesive composite, which includes an acrylic adhesive layer and a polyurethane adhesive layer. This adhesive-composite forming procedure is disclosed earlier.

The method can also include a step of heat bonding a thermoplastic substrate layer to the adhesive layer, preferably to the acrylic adhesive layer. As noted earlier, the thermoplastic substrate layer is preferably comprised of polyvinyl chloride, thermoplastic olefins, polycarbonates, or acrylonitrile-butadiene-styrene copolymers.

Example 2: The method can include the following steps: casting an acrylic primer layer (Tedlar® 68070 from DuPont) at a dry thickness of 0.5 mil on FLUOREX® A; casting a polyurethane layer (SU 6729 from Stahl) at a dry thickness of 0.5 mil on the dried primer layer; depositing a layer of indium at an OD of 1.15 on the polyurethane surface through vacuum deposition; making an adhesive composite by casting an acrylic material (Elvacite® 2009) at a dry thickness of 0.5 mil on a 2 mil PET; casting a polyurethane (ADH 222 from Novacote®) at a dry thickness of 0.5 mil on dried Elvacite® 2009; adding a PET film to the indium surface and press polishing; removing the PET from the indium surface and bonding the ADH 222 surface of the adhesive composite onto the indium surface; removing the PET from the adhesive composite; bonding the composite to a 20 mil ABS through a hot nip at between 330° to 380° F.

The preferred embodiments of the invention and the method of making them are illustrated by the drawings, all of which are cross-sectional and schematic in nature, and are not intended to be drawn to scale, but instead are intended to illustrate the various layers in the films of the invention, the manner in which they are made, and their relationships to one other.

Figures 1, 2:
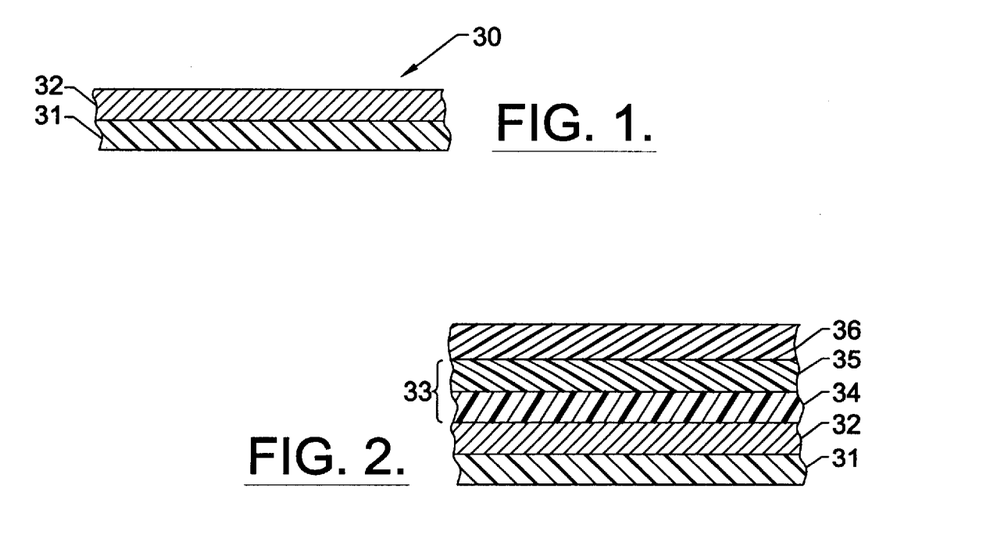
FIGS. 1–4 are schematic cross-sectional views of several embodiments of films according to the present invention.

Accordingly, FIG. 1 shows the broadest embodiment of the invention in the form of a bright metallized laminate broadly designated at 30 in which a polyvinylidene difluoride-containing film 31 with microscopically smooth surfaces has thereon a layer 32 of discontinuous indium islands deposited on the PVDF-containing film. As set forth above, the PVDF film is most preferably made from a polymer alloy of PVDF and an appropriate acrylic compound.

FIG. 2 illustrates that the metallized laminate 30 can further include an adhesive layer designated by the brackets 33 in FIG. 2 on the surface of the indium layer 32 and opposite to the PVDF-acrylic film 31. In preferred embodiments, the adhesive layer 33 is itself formed of a polyurethane layer 34 directly on the indium layer 32, and an acrylic layer 35 on the polyurethane layer 34. A thermoplastic backing 36 is placed on the adhesive layer 33 to complete the structure for eventual use.

Figure 3:
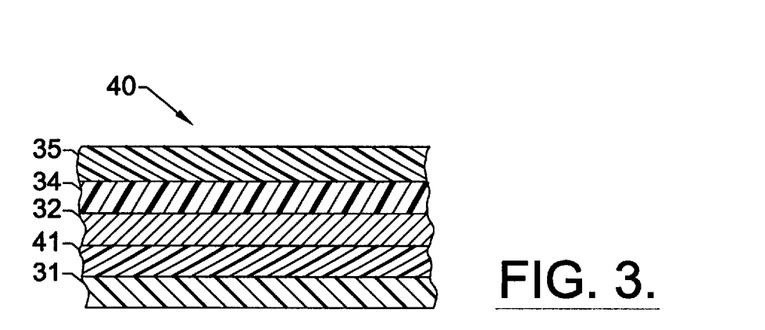

In another embodiment, broadly designated at 40 in FIG. 3, the bright metallized formable laminate includes the PVDF-acrylic layer that again is designated at 31 for consistency and clarity, along with the indium layer 32. This embodiment, however, includes the thermoplastic leveling layer 41 on the PVDF-acrylic layer 31. Consequently, the indium layer 32 is on the thermoplastic leveling layer 41 rather than directly on the PVDF-acrylic layer 31. As in the previous embodiments, the metallized laminate 40 preferably includes the adhesive layer formed by the respective polyurethane layer 34 and acrylic layer 35.

Figure 4:
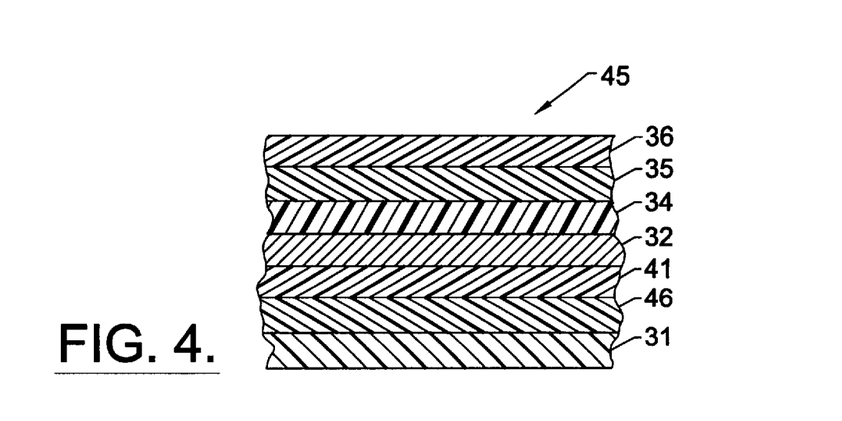

FIG. 4 shows an embodiment of the invention related to that of FIG. 3, and broadly designated at 45 that further includes a thermoplastic primer layer shown as the acrylic layer 46 between the PVDF-acrylic film 31 and the thermoplastic leveling layer 41. As in the embodiment illustrated in FIG. 3, the indium layer 32 is on the thermoplastic leveling layer 41, and the adhesive layer formed from the respective polyurethane layer 34 and acrylic layer 35 is on the indium. FIG. 4 illustrates the thermoplastic backing layer 36 that is also illustrated in FIG. 2.

Figures 5, 6, 7, 8, 9, 10, 11:
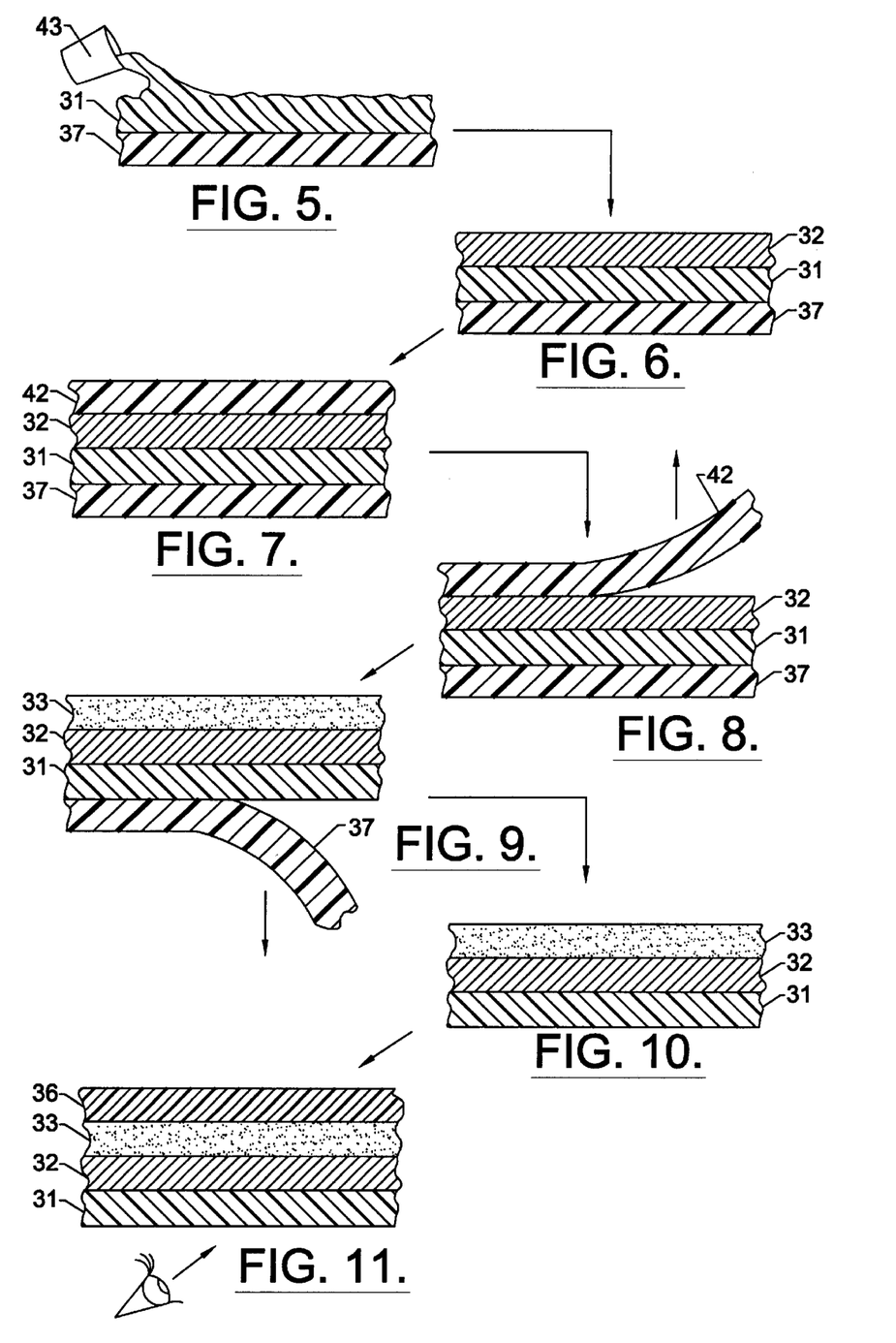
FIGS. 5–11 illustrate the sequence for forming one of the embodiments of the film of the present invention.
Figure 12:
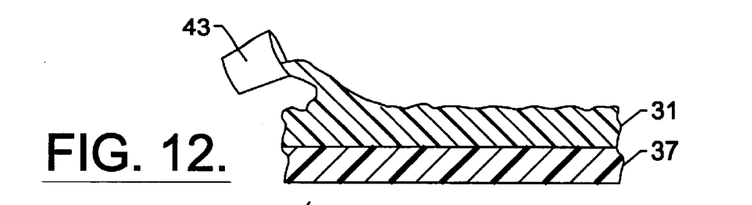
FIGS. 12–16 illustrate another sequence for forming one of the film embodiments of the present invention.
Figure 13:
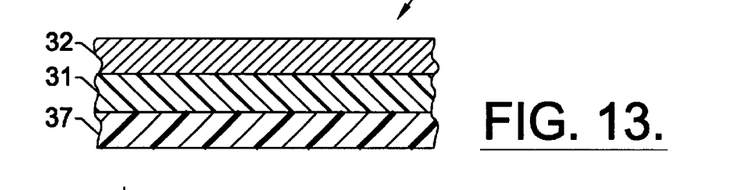

FIGS. 5–11 illustrate a first embodiment of a method of making the invention. Where possible, the respective layers will carry the same reference numerals as in the previous drawings. Accordingly, FIG. 5 shows that in a first step, the PVDF-acrylic composition is cast onto the layer 31 from an appropriate casting source schematically illustrated at 43, onto a polyester substrate 37. Suitable casting methods include a knife-over roll coating process, a reverse roll coating process, or preferably a slot die coating process. The discontinuous layer of indium islands 32 is then added to the PVDF-acrylic layer 31 resulting in the structure illustrated in FIG. 6. In the next step, a second polyester layer 42 is added for the purpose of press polishing the indium layer 32 in the manner described previously. FIG. 8 illustrates that this polyester layer 42 is then removed leaving the smooth surface of the indium layer 32 behind.

FIG. 9 illustrates the next two steps in which the original polyester layer 37 upon which the PVDF-acrylic layer 31 was first cast is removed while the adhesive layer 33 is applied to result in the structure of FIG. 10 comprising the PVDF layer 31, the indium layer 32, and the adhesive layer 33. FIG. 11 illustrates the final step in the process in which the thermoplastic backing layer 36 is added to the structure.

FIGS. 12–16 illustrate a method of making another embodiment of the present invention. As in the previous embodiment, the PVDF-acrylic layer 31 is cast from a source 43 onto a first polyester layer 37, after which the indium metal layer 32 is added to result in the structure of FIG. 13.

Figure 14:
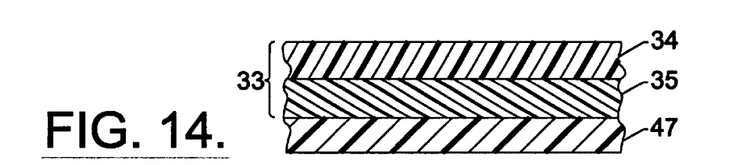
Figure 15:
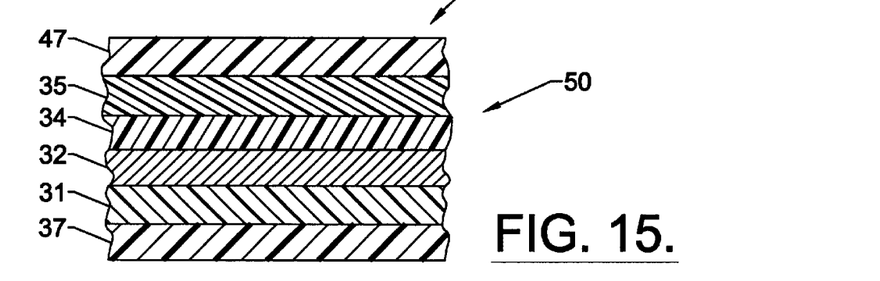
Figure 16:
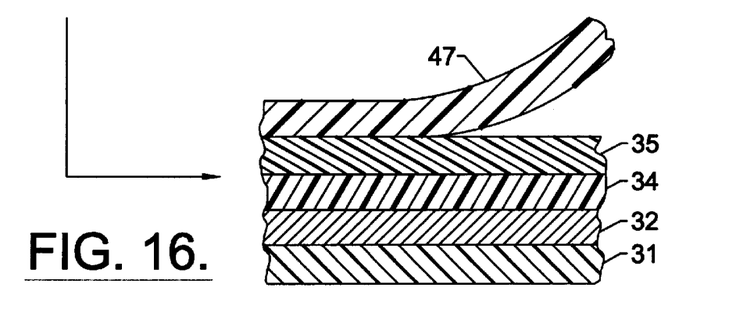
Figure 17:
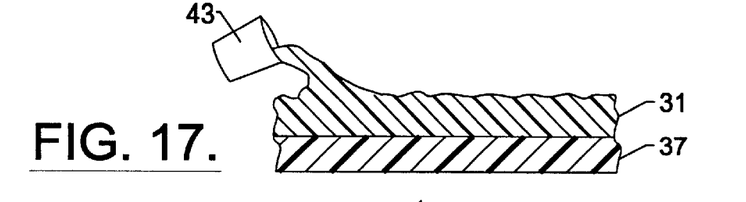
FIGS. 17–25 illustrate yet a third sequence for forming one of the film embodiments of the present invention.
Figure 18:
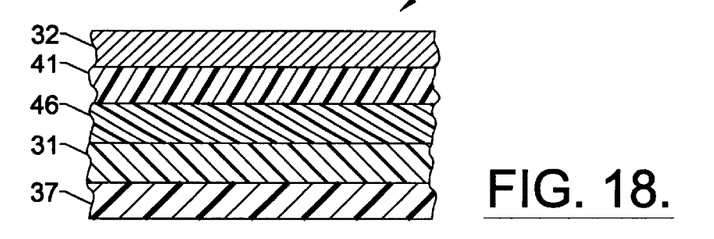

FIG. 14 illustrates the next step in the process in which the adhesive layer 33 is formed by applying the acrylic layer 35 and the polyurethane layers 34 to yet another polyester substrate 47. As indicated by the looping arrow between FIGS. 14 and 15, this structure which is broadly designated at 50 is applied to the structure of FIG. 13 with the polyurethane layer 34 being applied to the indium layer 32 to form the structure illustrated in FIG. 15. The polyester layers 37 and 47 can then be removed as partially indicated in FIG. 16 to produce the resulting structure.

Figure 19:
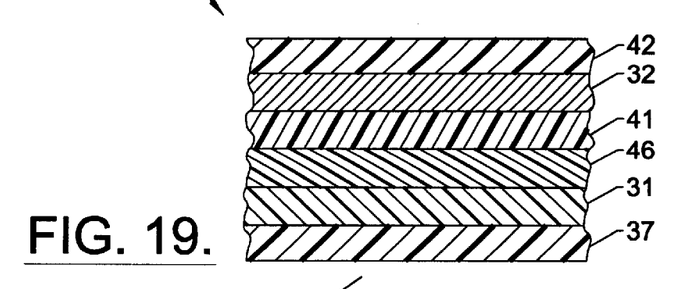
Figure 20:
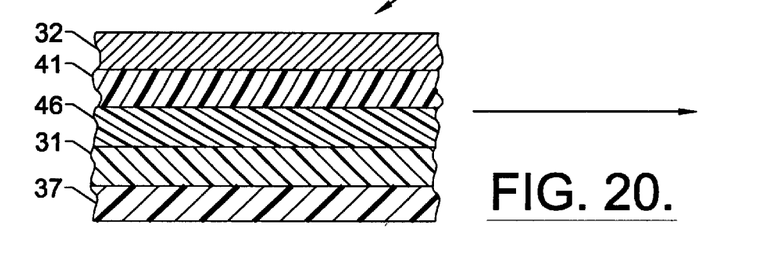
Figure 21:
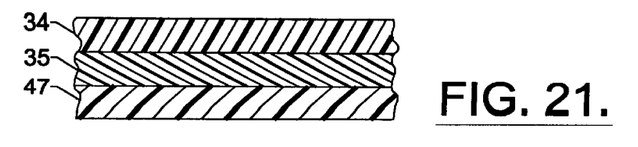
Figure 22:
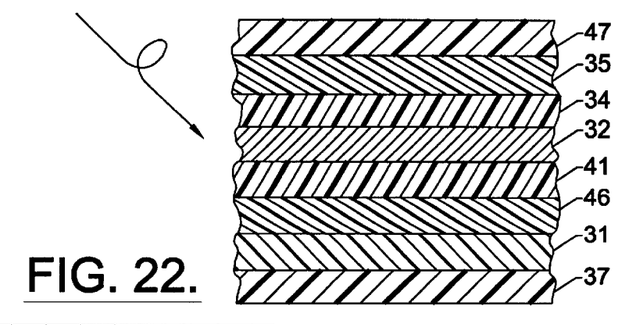
Figure 23:
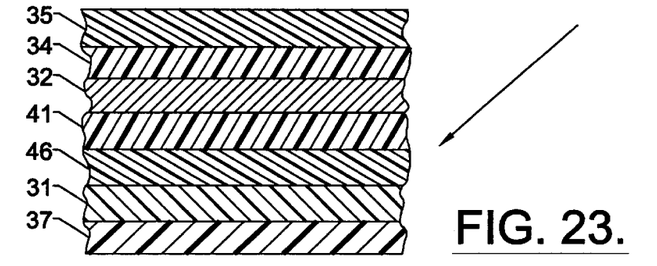
Figure 24:
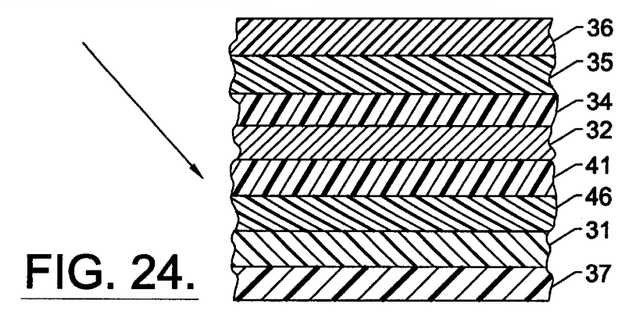
Figure 25:
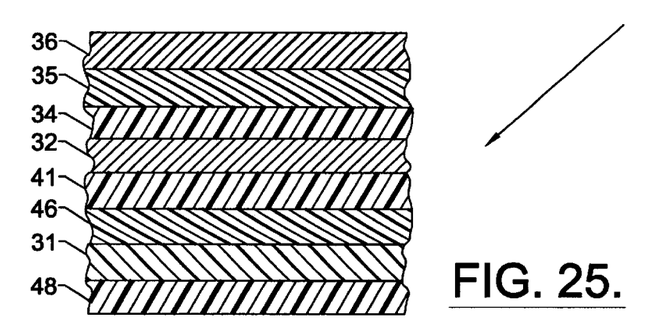

FIGS. 17–25 illustrate yet a third method of producing metallized laminates according to the present invention. As in the previous two method embodiments, the method initially comprises the step of casting the PVDF layer 31 onto an appropriate substrate such as the polyester 37. As illustrated by the progression from FIG. 17 to FIG. 18, however, in this embodiment the acrylic primer layer 46 and polyurethane leveling layer 41 are applied to the PVDF-acrylic layer 31 before the indium layer 32 is added. FIG. 19 illustrates that a polyester layer 42 is added to facilitate press polishing. Layer 42 is then removed from the structure to result in the structure shown in FIG. 20. FIG. 21 again illustrates that in a separate step an adhesive layer formed of the acrylic composition 35 and the polyurethane 34 on the polyester carrier substrate 47 is added to the structure of FIG. 20 to result in the overall structure illustrated in FIG. 22. Removing the polyester carrier substrate 47 from the adhesive layers produces the structure illustrated in FIG. 23, following which the thermoplastic backing layer 36 is added to complete the structure. The original polyester substrate 37 can be removed as desired prior to later use of the laminate, such as to add polyurethane mask layer 48. The inclusion of a mask layer results in the structure shown in FIG. 25.

In the drawings and specification, typical embodiments of the invention have been disclosed. Specific terms have been used only in a generic and descriptive sense, and not for purposes of limitation. The scope of the invention is set forth in the following claims.

That which is claimed is:

1. A bright metallized laminate, comprising:
   a polyvinylidene difluoride-containing film having microscopically smooth surfaces; and
   a discontinuous layer of indium islands deposited on said polyvinylidene difluoride film.

2. A metallized laminate according to claim 1, wherein said polyvinylidene difluoride-containing film is a polyvinylidene difluoride-acrylic film comprising between about 30% and 90% by weight of polyvinylidene difluoride and between about 10% and 70% by weight of an acrylic polymer.

3. A metallized laminate according to claim 2 wherein the surface of said polyvinyl idene difluoride-acrylic film has a roughness average of about 0.75 micron or less.

4. A metallized laminate according to claim 2 further comprising an adhesive layer placed on the surface of said discontinuous indium layer opposite said polyvinylidene difluoride-acrylic film.

5. A metallized laminate according to claim 4, wherein said adhesive layer is an adhesive selected from the group consisting of alcohol-based adhesives and water-based adhesives.

6. A metallized laminate according to claim 4, wherein:
said adhesive layer is comprised of a polyurethane layer and an acrylic layer; and
said polyurethane layer of said adhesive layer is positioned between said discontinuous indium layer and said acrylic layer of said adhesive layer.

7. A metallized laminate according to claim 4 further comprising a thermoplastic backing layer placed on said adhesive layer, wherein said backing layer is selected from the group consisting of polyvinyl chloride, thermoplastic olefins, polycarbonates, and acrylonitrile-butadiene-styrene copolymers.

8. A metallized laminate according to claim 7, wherein the metallized laminate incorporates a component selected from the group consisting of a tinted polyvinylidene difluoride-acrylic film, a tinted adhesive layer, and a tinted thermoplastic backing layer.

9. A metallized laminate according to claim 7 further comprising an extensible polyurethane mask layer on the surface of said polyvinylidene difluoride-acrylic film opposite said discontinuous indium layer.

10. A metallized laminate according to claim 1 further comprising an extensible polyurethane mask layer on the surface of said polyvinylidene difluoride-containing film opposite said discontinuous indium layer.

11. A part formed from the metallized laminate of claim 1.

12. A part according to claim 11 that has been formed using a technique selected from the group consisting of injection molding, blow molding, compression molding, thermoforming, and in-mold forming.

13. A part according to claim 11, wherein the polyvinylidene difluoride-containing film is a tinted polyvinylidene difluoride-containing film.

14. A bright metallized laminate, comprising:
a polyvinylidene difluoride-containing film having microscopically smooth surfaces;
a discontinuous layer of indium islands deposited on said polyvinylidene difluoride-containing film;
an adhesive layer bonded to the surface of said discontinuous indium layer opposite said polyvinylidene difluoride-containing film; and
a thermoplastic backing layer bonded to said adhesive layer opposite said discontinuous layer of indium islands.

15. A metallized laminate according to claim 14, wherein the metallized laminate incorporates a component selected from the group consisting of a tinted polyvinylidene difluoride-containing film, a tinted adhesive layer, and a tinted thermoplastic backing layer.

16. A die cut article formed from the laminate of claim 14.

17. A metallized laminate according to claim 14, wherein said polyvinylidene difluoride-containing film is made from a polymer comprising between about 30% and 90% by weight of polyvinylidene difluoride and between about 10% and 70% by weight of an acrylic polymer.

18. A metallized laminate according to claim 14, wherein said adhesive layer is an adhesive selected from the group consisting of alcohol-based adhesives and water-based adhesives.

19. A metallized laminate according to claim 14, wherein said adhesive layer is comprised of a polyurethane layer and an acrylic layer.

20. A metallized laminate according to claim 19, wherein:
said polyurethane layer of said adhesive layer is positioned between said discontinuous indium layer and said acrylic layer of said adhesive layer; and
said acrylic layer of said adhesive layer is positioned between said thermoplastic backing layer and said polyurethane layer of said adhesive layer.

21. A metallized laminate according to claim 14, wherein said thermoplastic backing layer is selected from the group consisting of polyvinyl chloride, thermoplastic olefins, acrylonitrile-butadiene-styrene copolymers, polycarbonates, polystyrenes, and blends of these polymers.

22. A part formed from the metallized laminate of claim 14.

23. A part according to claim 12 that is die cut.

24. A metallized laminate according to claim 14 further comprising an extensible polyurethane mask layer on the surface of said polyvinylidene difluoride-containing film opposite said discontinuous indium layer.

25. A part formed from the metallized laminate of claim 24.

26. A bright metallized laminate that may be die-cut into articles, comprising:
a polyvinylidene difluoride-acrylic film having microscopically smooth surfaces, wherein said film is made from a polymer comprising between about 30% and 90% by weight of polyvinylidene difluoride and between about 10% and 70% by weight of an acrylic polymer;
a discontinuous layer of indium islands deposited on said polyvinylidene difluoride-acrylic film;
an polyurethane adhesive layer bonded to the surface of said discontinuous indium layer opposite said polyvinylidene difluoride-acrylic film;
an acrylic adhesive layer bonded the surface of said polyurethane adhesive layer opposite said discontinuous indium layer; and
a thermoplastic backing layer bonded to said acrylic adhesive layer opposite said polyurethane adhesive layer.

27. A metallized laminate according to claim 26, wherein the metallized laminate incorporates a component selected from the group consisting of a tinted polyvinylidene difluoride-acrylic film, a tinted polyurethane adhesive layer, a tinted acrylic adhesive layer, and a tinted thermoplastic backing layer.

28. A part formed from the metallized laminate of claim 26.

29. A metallized laminate according to claim 26 further comprising an extensible polyurethane mask layer on the surface of said polyvinylidene difluoride-acrylic film opposite said discontinuous indium layer.

30. A part formed from the metallized laminate of claim 29.

31. A bright metallized formable laminate, comprising:
a polyvinylidene difluoride-containing film having microscopically smooth surfaces;

a thermoplastic leveling layer on said polyvinylidene difluoride-containing film; and a discontinuous layer of indium islands deposited on said leveling layer opposite said polyvinylidene difluoride-containing film.

32. A metallized laminate according to claim 31, wherein the metallized laminate incorporates a component selected from the group consisting of a tinted polyvinylidene difluoride-containing film and a tinted thermoplastic leveling layer.

33. A metallized formable laminate according to claim 31, wherein said polyvinylidene difluoride-containing film comprises between about30% and 90% by weight of polyvinylidene difluoride and between about 10% and 70% by weight of an acrylic polymer.

34. A metallized formable laminate according to claim 31, wherein said leveling layer is a polymer selected from the group consisting of polyurethane and acrylate polymers.

35. A metallized formable laminate according to claim 31 further comprising a thermoplastic primer layer between said polyvinylidene difluoride-acrylic film and said leveling layer.

36. A metallized formable laminate according to claim 35, wherein said thermoplastic primer layer is comprised of an acrylic compound.

37. A metallized formable laminate according to claim 31 further comprising an adhesive layer placed on the surface of said discontinuous indium layer opposite said leveling layer.

38. A metallized laminate according to claim 37, wherein said adhesive layer is an adhesive selected from the group consisting of alcohol-based adhesives and water-based adhesives.

39. A metallized formable laminate according to claim 37, wherein said adhesive layer is comprised of a polyurethane layer and an acrylic layer.

40. A metallized formable laminate according to claim 39, wherein said polyurethane layer of said adhesive layer is positioned between said discontinuous indium layer and said acrylic layer of said adhesive layer.

41. A metallized formable laminate according to claim 37 further comprising a thermoplastic backing layer on said adhesive layer, wherein said backing layer is selected from the group consisting of polyvinyl chloride, thermoplastic olefins, acrylonitrile-butadiene-styrene copolymers, polycarbonates, polystyrenes, and blends of these polymers.

42. A metallized laminate according to claim 41 further comprising an extensible polyurethane mask layer on the surface of said polyvinylidene difluoride-containing film opposite said discontinuous indium layer.

43. A part formed from the metallized laminate of claim 31.

44. A part according to claim 43 that is injection-molded.

45. An injection-molded part according to claim 44, further comprising:

a filler material within the interior of said injection-molded part; and a strength forming resin between said injection-molded part and said filler material.

46. A metallized laminate according to claim 31 further comprising an extensible polyurethane mask layer on the surface of said polyvinylidene difluoride-containing film opposite said discontinuous indium layer.

47. A part formed from the metallized laminate of claim 46.

48. A bright metallized formable laminate, comprising:

a polyvinylidene difluoride-acrylic film having microscopically smooth surfaces, wherein said film is made from a polymer comprising between about 30% and 90% by weight of polyvinylidene difluoride and between about 10% and 70% by weight of an acrylic polymer;

an acrylic primer layer on said polyvinylidene difluoride-acrylic film;

a thermoplastic leveling layer on said primer layer, wherein said leveling layer is a polymer selected from the group consisting of polyurethane and acrylic;

a discontinuous layer of indium islands deposited on said leveling layer opposite said primer layer;

an polyurethane adhesive layer bonded to the surface of said discontinuous indium layer opposite said leveling layer;

an acrylic adhesive layer bonded to the surface of said polyurethane adhesive layer opposite said discontinuous indium layer; and a thermoplastic backing layer bonded to said acrylic adhesive layer opposite said polyurethane adhesive layer, wherein said thermoplastic backing layer is selected from the group consisting of polyvinyl chloride, thermoplastic olefins, acrylonitrile-butadiene-styrene copolymers, polycarbonates, polystyrenes, and blends of these polymers.

49. A part formed from the metallized laminate of claim 48.

50. A part according to claim 49 that has been formed using a technique selected from the group consisting of injection molding, blow molding, compression molding, thermoforming, and in-mold forming.

51. A metallized laminate according to claim 48 further comprising an extensible polyurethane mask layer on the surface of said polyvinylidene difluoride-acrylic film opposite said acrylic primer layer.

52. A part formed from the metallized laminate of claim 51.

53. A part according to claim 52 that has been formed using a technique selected from the group consisting of injection molding, blow molding, compression molding, thermoforming, and in-mold forming.

54. A bright metallized formable laminate, comprising:

a polyvinylidene difluoride-containing film having a microscopically-smooth surface; and a discontinuous layer of indium islands deposited on said microscopically-smooth surface of said polyvinylidene difluoride-containing film.

55. A bright metallized formable laminate according to claim 54, wherein said polyvinylidene difluoridecontaining film is a polyvinylidene difluoride-acrylic film comprising between about 30% and 90% by weight of polyvinylidene difluoride and between about 10% and 70% by weight of an acrylic polymer.

56. A bright metallized formable laminate according to claim 54, wherein said polyvinylidene difluoride-containing film is a tinted polyvinylidene difluoride-containing film.

57. A bright metallized formable laminate according to claim 54, further comprising an adhesive layer on said discontinuous indium layer, opposite said polyvinylidene difluoride-containing film.

58. A bright metallized formable laminate according to claim 57, wherein said adhesive layer comprises polyurethane.

59. A bright metallized formable laminate according to claim 57, wherein said adhesive layer comprises acrylic.

60. A bright metallized formable laminate according to claim 57, wherein said adhesive layer is a composite adhesive layer.

61. A bright metallized formable laminate according to claim 57, further comprising a thermoplastic backing layer on said adhesive layer, opposite said discontinuous indium layer.

62. A bright metallized formable laminate according to claim 61, wherein said thermoplastic backing layer is selected from the group consisting of polyvinyl chloride, thermoplastic olefins, acrylonitrile-butadiene-styrene copolymers, polycarbonates, polystyrenes, and blends of these polymers.

63. A bright metallized formable laminate according to claim 54, further comprising an extensible polyurethane mask layer on said polyvinylidene difluoride-containing film, opposite said discontinuous indium layer.

64. A part formed from the bright metallized formable laminate of claim 54.

65. A bright metallized formable laminate, comprising:
a polyvinylidene difluoride-containing film;
a thermoplastic leveling layer on said polyvinylidene difluoride-containing film; and
a discontinuous layer of indium islands deposited on said thermoplastic leveling layer, opposite said polyvinylidene difluoride-containing film.

66. A bright metallized formable laminate according to claim 65, wherein said polyvinylidene difluoride-containing film is a polyvinylidene difluoride-acrylic film comprising between about 30% and 90% by weight of polyvinylidene difluoride and between about 10% and 70% by weight of an acrylic polymer.

67. A bright metallized formable laminate according to claim 66, wherein said polyvinylidene difluoride-acrylic film a tinted polyvinylidene difluoride-acrylic film.

68. A bright metallized formable laminate according to claim 66, wherein said thermoplastic leveling layer is a tinted thermoplastic leveling layer.

69. A bright metallized formable laminate according to claim 66, wherein said thermoplastic leveling layer comprises polyurethane.

70. A bright metallized formable laminate according to claim 66, wherein said thermoplastic leveling layer comprises acrylate polymers.

71. A bright metallized formable laminate according to claim 66, further comprising a thermoplastic primer layer between said polyvinylidene difluoride-acrylic film and said leveling layer.

72. A bright metallized formable laminate according to claim 71, wherein said thermoplastic primer layer comprises acrylic.

73. A bright metallized formable laminate according to claim 66, further comprising an adhesive layer on said discontinuous indium layer, opposite said thermoplastic leveling layer.

74. A bright metallized formable laminate according to claim 73, wherein said adhesive layer is a tinted adhesive layer.

75. A bright metallized formable laminate according to claim 73, wherein said adhesive layer comprises polyurethane.

76. A bright metallized formable laminate according to claim 73, wherein said adhesive layer comprises acrylic.

77. A bright metallized formable laminate according to claim 73, wherein said adhesive layer is a composite adhesive.

78. A bright metallized formable laminate according to claim 73, further comprising a thermoplastic backing layer on said adhesive layer, opposite said discontinuous indium layer.

79. A bright metallized formable laminate according to claim 78, wherein said thermoplastic backing layer is selected from the group consisting of polyvinyl chloride, thermoplastic olefins, acrylonitrile-butadiene-styrene copolymers, polystyrenes, polycarbonates, and blends of these polymers.

80. A bright metallized formable laminate according to claim 78, wherein said thermoplastic backing layer is a tinted thermoplastic backing layer.

81. A bright metallized formable laminate according to claim 78, further comprising a thermoplastic primer layer between said polyvinylidene difluoride-acrylic film and said leveling layer.

82. A bright metallized formable laminate according to claim 66, further comprising an extensible polyurethane mask layer on said polyvinylidene difluoride-acrylic film, opposite said leveling layer.

83. A part formed from the bright metallized formable laminate of claim 66.

* * * * *

UNITED STATES PATENT AND TRADEMARK OFFICE
CERTIFICATE OF CORRECTION

PATENT NO.    : 6,287,672 B1
DATED         : September 11, 2001
INVENTOR(S)   : Fields et al.

It is certified that error appears in the above-identified patent and that said Letters Patent is hereby corrected as shown below:

Column 13,
Line 5, "polyvinyl idene" should read -- polyvinylidene --.

Column 14,
Line 25, "12" should read -- 22 --.

Signed and Sealed this

Twentieth Day of May, 2003

JAMES E. ROGAN
*Director of the United States Patent and Trademark Office*